US010913542B2

(12) United States Patent
King et al.

(10) Patent No.: US 10,913,542 B2
(45) Date of Patent: Feb. 9, 2021

(54) CONVERSION ACTUATOR AND DOWNSTOP STRIKER FITTING FOR A TILTROTOR AIRCRAFT

(71) Applicant: Bell Helicopter Textron Inc., Fort Worth, TX (US)

(72) Inventors: James E. King, North Richland Hills, TX (US); William Scott Atkins, Farmers Branch, TX (US); George R. Decker, Mansfield, TX (US)

(73) Assignee: Textron Innovations Inc., Fort Worth, TX (US)

( * ) Notice: Subject to any disclaimer, the term of this patent is extended or adjusted under 35 U.S.C. 154(b) by 668 days.

(21) Appl. No.: 16/047,503

(22) Filed: Jul. 27, 2018

(65) Prior Publication Data
US 2020/0031488 A1 Jan. 30, 2020

(51) Int. Cl.
*B64D 35/00* (2006.01)
*F16H 57/025* (2012.01)
(Continued)

(52) U.S. Cl.
CPC .......... *B64D 35/00* (2013.01); *B64C 29/0033* (2013.01); *F16H 57/025* (2013.01); *F16H 2057/02043* (2013.01)

(58) Field of Classification Search
CPC ... B64C 29/0033; B64C 3/187; B64C 11/306; B64C 11/46; B64D 35/00; B64D 27/26;
(Continued)

(56) References Cited

U.S. PATENT DOCUMENTS

| 1,846,992 A | * | 2/1932 | Cecil Decker | ...... B64C 29/0033 244/7 C |
| 2,450,821 A | * | 10/1948 | Zimmerman | ....... B64C 29/0033 244/12.1 |

(Continued)

FOREIGN PATENT DOCUMENTS

| EP | 2484587 A1 | 8/2012 |
| WO | 2006041455 A1 | 4/2006 |

(Continued)

OTHER PUBLICATIONS

USPTO Non-Final Office Action for U.S. Appl. No. 16/050,185 dated Aug. 3, 2020.
(Continued)

*Primary Examiner* — Medhat Badawi
(74) *Attorney, Agent, or Firm* — Patent Capital Group

(57) ABSTRACT

A wing is provided in one example embodiment and may include an outboard rib; a proprotor gearbox, wherein the proprotor gearbox is located inboard of the outboard rib; a fitting attached to the proprotor gearbox; and a conversion actuator, wherein the conversion actuator is attached to the wing and is mechanically coupled to the fitting. The wing may further include a downstop striker in which the downstop striker may be mounted to the fitting and the downstop striker may be between the proprotor gearbox and the conversion actuator. The wing may further include a downstop mounted on a top side of the outboard rib, wherein the downstop and the downstop striker are aligned to be in contact when the proprotor gearbox is positioned in an airplane mode.

13 Claims, 9 Drawing Sheets

(51) Int. Cl.
*B64C 29/00* (2006.01)
*F16H 57/02* (2012.01)

(58) Field of Classification Search
CPC ..... B64D 2027/264; F16H 2057/02043; F16H 2057/02082; F16H 57/025
See application file for complete search history.

(56) References Cited

U.S. PATENT DOCUMENTS

| | | | | |
|---|---|---|---|---|
| 2,621,001 A * | 12/1952 | Roman | B64C 29/0033 | 244/7 C |
| 2,814,451 A * | 11/1957 | Turner | B64C 29/0033 | 244/7 R |
| 2,936,967 A * | 5/1960 | Dancik | B64C 29/0033 | 244/7 C |
| 2,936,968 A * | 5/1960 | Mazzitelli | B64C 29/0033 | 244/7 C |
| 2,961,189 A * | 11/1960 | Doak | B64C 29/0033 | 244/12.4 |
| 3,065,929 A * | 11/1962 | Holland, Jr. | B64C 29/0033 | 244/12.4 |
| 3,106,369 A * | 10/1963 | Borst | B64C 29/0033 | 244/7 R |
| 3,107,882 A * | 10/1963 | Matteson | B64C 29/0033 | 244/7 C |
| 3,181,810 A * | 5/1965 | Olson | B64C 29/0033 | 244/7 R |
| 3,197,157 A * | 7/1965 | King | B64C 29/0033 | 244/7 C |
| 3,259,343 A * | 7/1966 | Roppel | B64C 29/0091 | 244/53 R |
| 3,266,754 A * | 8/1966 | King | B64C 29/0033 | 244/231 |
| 3,284,027 A * | 11/1966 | Mesniere | B64C 29/0033 | 244/12.4 |
| 3,360,217 A * | 12/1967 | Trotter | B64C 29/0033 | 244/12.4 |
| 3,666,209 A * | 5/1972 | Taylor | B64C 29/0033 | 244/7 C |
| 3,703,832 A * | 11/1972 | Lindsey | G01C 19/28 | 74/5.45 |
| 3,797,783 A * | 3/1974 | Kisovec | B64C 29/0033 | 244/7 A |
| 4,136,845 A * | 1/1979 | Eickmann | B64C 11/28 | 244/12.4 |
| 4,142,697 A * | 3/1979 | Fradenburgh | B64C 11/003 | 244/7 R |
| 4,245,804 A * | 1/1981 | Ishimitsu | B64C 23/069 | 244/91 |
| 4,436,261 A * | 3/1984 | Koleff | B64C 29/0033 | 244/1 R |
| 4,496,120 A * | 1/1985 | Eickmann | B64C 11/28 | 244/105 |
| 4,682,512 A * | 7/1987 | Peterson | B64C 27/12 | 416/170 R |
| 4,691,878 A * | 9/1987 | Vaughan | B64C 3/56 | 244/49 |
| 4,783,023 A * | 11/1988 | Jupe | B64C 27/12 | 244/17.19 |
| 4,979,698 A * | 12/1990 | Lederman | B64C 29/0033 | 244/17.13 |
| 5,054,716 A * | 10/1991 | Wilson | B64C 29/0033 | 244/56 |
| 5,085,315 A * | 2/1992 | Sambell | B64C 27/30 | 244/17.25 |
| 5,092,539 A * | 3/1992 | Caero | B64C 27/28 | 244/99.9 |
| 5,096,140 A * | 3/1992 | Dornier, Jr. | B64C 29/0033 | 244/12.4 |
| 5,141,176 A * | 8/1992 | Kress | B64C 29/0033 | 244/48 |
| 5,645,250 A * | 7/1997 | Gevers | B64C 3/38 | 244/101 |
| 5,749,540 A * | 5/1998 | Arlton | B64C 27/82 | 244/17.13 |
| 5,868,351 A * | 2/1999 | Stamps | B64C 27/50 | 244/12.4 |
| 6,030,177 A * | 2/2000 | Hager | F03D 1/0608 | 416/87 |
| 6,220,545 B1 * | 4/2001 | Fenny | B64C 29/0033 | 244/7 R |
| 6,247,667 B1 * | 6/2001 | Fenny | B64C 29/0033 | 244/56 |
| 6,260,793 B1 * | 7/2001 | Balayn | B64C 7/00 | 244/130 |
| 6,276,633 B1 * | 8/2001 | Balayn | B64C 27/12 | 244/56 |
| 6,367,736 B1 * | 4/2002 | Pancotti | B64C 29/0033 | 244/48 |
| 6,607,161 B1 * | 8/2003 | Krysinski | B64C 9/00 | 244/7 A |
| 6,843,447 B2 * | 1/2005 | Morgan | B64C 29/0025 | 244/12.3 |
| 7,306,186 B2 | 12/2007 | Kusic | | |
| 7,520,041 B1 * | 4/2009 | Aguilar | B25B 27/023 | 29/255 |
| 7,866,598 B2 * | 1/2011 | Waide | B64D 35/00 | 244/7 R |
| 7,871,033 B2 | 1/2011 | Karem et al. | | |
| 7,874,513 B1 * | 1/2011 | Smith | B64C 29/0033 | 244/12.4 |
| 7,913,947 B2 | 3/2011 | Haynes et al. | | |
| 8,152,096 B2 * | 4/2012 | Smith | B64C 29/0033 | 244/60 |
| 8,292,216 B1 * | 10/2012 | Rumberger, Jr. | B64F 5/50 | 244/39 |
| 8,322,647 B2 | 12/2012 | Amraly et al. | | |
| 8,366,049 B2 | 2/2013 | Karem | | |
| 8,602,347 B2 | 12/2013 | Isaac et al. | | |
| 8,636,473 B2 * | 1/2014 | Brunken, Jr. | B64C 29/0033 | 416/114 |
| 8,733,690 B2 * | 5/2014 | Bevirt | B64C 29/0033 | 244/12.4 |
| 8,960,591 B2 | 2/2015 | Pancotti | | |
| 9,126,678 B2 * | 9/2015 | Ross | B64C 29/0033 | |
| 9,199,732 B2 | 12/2015 | Isaac et al. | | |
| 9,475,585 B2 * | 10/2016 | Hong | B64C 29/0033 | |
| 9,663,225 B1 * | 5/2017 | Kooiman | B64F 5/40 | |
| 9,694,911 B2 | 7/2017 | Bevirt et al. | | |
| 9,783,292 B2 * | 10/2017 | Kooiman | B64C 29/0033 | |
| 9,809,318 B1 * | 11/2017 | Williams | F16C 17/26 | |
| 9,856,029 B2 * | 1/2018 | King | F16C 29/002 | |
| 9,868,541 B2 * | 1/2018 | Kooiman | B64C 27/22 | |
| 9,868,542 B2 * | 1/2018 | Williams | B64C 27/26 | |
| 9,889,927 B2 * | 2/2018 | Modrzejewski | B64C 27/001 | |
| 9,981,734 B2 * | 5/2018 | Ivans | B64C 3/32 | |
| 10,011,349 B2 * | 7/2018 | Ivans | B64C 29/0033 | |
| 10,279,892 B2 * | 5/2019 | Bosworth | B64C 29/0033 | |
| 10,279,901 B2 * | 5/2019 | Ivans | B64D 33/02 | |
| 10,486,806 B2 | 11/2019 | Alber | | |
| D870,639 S * | 12/2019 | Ivans | D12/328 | |
| 10,589,838 B1 * | 3/2020 | Suppes | B64C 27/001 | |
| 10,633,092 B2 * | 4/2020 | Willford | G05D 1/0055 | |
| 2002/0100835 A1 * | 8/2002 | Kusic | B64C 29/0033 | 244/17.23 |
| 2004/0038768 A1 * | 2/2004 | Thomassey | B64C 27/12 | 475/221 |
| 2005/0045762 A1 * | 3/2005 | Pham | B64C 27/28 | 244/7 R |
| 2005/0127238 A1 * | 6/2005 | Ballew | B64C 27/10 | 244/10 |
| 2005/0230520 A1 * | 10/2005 | Kusic | B64C 27/08 | 244/12.4 |
| 2006/0151272 A1 * | 7/2006 | Smith | F16F 7/108 | 188/378 |
| 2007/0102573 A1 * | 5/2007 | Goto | B64D 15/00 | 244/76 R |

(56) References Cited

U.S. PATENT DOCUMENTS

| | | | | |
|---|---|---|---|---|
| 2007/0158494 A1* | 7/2007 | Burrage | B64C 39/04 244/7 R |
| 2007/0205325 A1* | 9/2007 | Waide | F16D 3/065 244/60 |
| 2007/0241228 A1* | 10/2007 | Haynes | B64C 29/0033 244/7 A |
| 2009/0227415 A1* | 9/2009 | Buelna | B64D 35/00 475/346 |
| 2009/0256026 A1* | 10/2009 | Karem | B64C 27/08 244/99.2 |
| 2009/0266941 A1* | 10/2009 | Karem | B64C 3/185 244/7 A |
| 2009/0266942 A1* | 10/2009 | Karem | B64C 29/0033 244/7 C |
| 2010/0171001 A1* | 7/2010 | Karem | B64D 1/08 244/7 R |
| 2010/0276549 A1* | 11/2010 | Karem | B64C 29/0033 244/7 A |
| 2010/0327123 A1* | 12/2010 | Smith | B64C 27/28 244/7 C |
| 2011/0284684 A1* | 11/2011 | Amraly | B64D 35/04 244/12.4 |
| 2011/0315827 A1* | 12/2011 | Collins | B64C 29/0033 244/7 A |
| 2012/0199699 A1* | 8/2012 | Isaac | B64C 29/0033 244/7 R |
| 2012/0211608 A1* | 8/2012 | Pancotti | B64C 29/0033 244/7 C |
| 2013/0026302 A1* | 1/2013 | Lee | B64C 3/385 244/7 R |
| 2013/0026303 A1* | 1/2013 | Wang | B64C 11/001 244/7 R |
| 2013/0078100 A1* | 3/2013 | Baskin | B64C 27/37 416/204 R |
| 2013/0099065 A1* | 4/2013 | Stuhlberger | B64C 29/0033 244/7 C |
| 2014/0034781 A1* | 2/2014 | Kouros | B64D 27/24 244/60 |
| 2014/0061392 A1* | 3/2014 | Karem | B64C 3/16 244/7 R |
| 2014/0217243 A1 | 8/2014 | Isaac et al. | |
| 2014/0263854 A1* | 9/2014 | Ross | B64C 29/0033 244/7 A |
| 2015/0048213 A1* | 2/2015 | Ross | B64C 29/0033 244/7 A |
| 2015/0048214 A1* | 2/2015 | Bockmiller | B64F 5/40 244/7 A |
| 2015/0266571 A1* | 9/2015 | Bevirt | B64C 29/0033 244/7 C |
| 2015/0360774 A1* | 12/2015 | Covington | B64C 29/0033 244/7 R |
| 2016/0026190 A1* | 1/2016 | Kowalski | G01P 5/18 701/7 |
| 2016/0122039 A1* | 5/2016 | Ehinger | B64D 35/00 416/170 R |
| 2016/0229531 A1* | 8/2016 | Robertson | B64C 39/04 |
| 2016/0304194 A1* | 10/2016 | Bevirt | B64C 7/02 |
| 2017/0137122 A1* | 5/2017 | Kooiman | F16H 1/006 |
| 2017/0158323 A1* | 6/2017 | Ross | B64D 27/12 |
| 2017/0217598 A1* | 8/2017 | Bacon | B64D 27/10 |
| 2017/0259521 A1* | 9/2017 | Kooiman | B29D 24/005 |
| 2017/0259904 A1* | 9/2017 | Kooiman | B64C 3/187 |
| 2017/0259905 A1* | 9/2017 | Kooiman | B29D 24/005 |
| 2018/0079485 A1* | 3/2018 | Kooiman | B64C 27/50 |
| 2018/0079486 A1* | 3/2018 | Kooiman | B64C 27/50 |
| 2018/0079499 A1* | 3/2018 | Foskey | B64C 3/56 |
| 2018/0086446 A1* | 3/2018 | Alber | B64C 5/02 |
| 2018/0251227 A1* | 9/2018 | Ross | B64C 7/02 |
| 2018/0297695 A1* | 10/2018 | Ramirez-Serrano | B64C 27/82 |
| 2018/0312251 A1* | 11/2018 | Petrov | B64C 3/42 |
| 2018/0370624 A1* | 12/2018 | Seale | B64C 27/16 |
| 2019/0248483 A1* | 8/2019 | Przybyla | B64C 11/28 |
| 2019/0256190 A1* | 8/2019 | Olson | B64D 35/04 |
| 2019/0257425 A1* | 8/2019 | Gilliland | F16J 15/04 |
| 2019/0277392 A1* | 9/2019 | Gilliland | B64C 29/0033 |
| 2019/0323563 A1* | 10/2019 | Gilliland | F16C 1/02 |
| 2019/0337629 A1* | 11/2019 | Gilliland | B64C 27/28 |
| 2019/0338810 A1* | 11/2019 | Gilliland | B64D 35/04 |
| 2019/0344877 A1* | 11/2019 | Gilliland | B64C 3/56 |
| 2019/0389571 A1* | 12/2019 | Gilliland | B64D 35/08 |
| 2019/0389572 A1* | 12/2019 | Gilliland | B64C 29/0033 |
| 2020/0031488 A1* | 1/2020 | King | B64C 29/0033 |
| 2020/0039642 A1* | 2/2020 | Kooiman | B64D 27/26 |
| 2020/0156780 A1* | 5/2020 | Varigas | B64C 39/068 |

FOREIGN PATENT DOCUMENTS

| | | |
|---|---|---|
| WO | 2009126905 A1 | 10/2009 |
| WO | 2016062223 A1 | 4/2016 |

OTHER PUBLICATIONS

EPO Examination Report issued in EP Application 19179165.6 dated Jan. 29, 2020, 7 pages.

EPO Search Report issued in EP Application 19179165.6 dated Dec. 20, 2019, 5 pages.

* cited by examiner

CONVERSION ACTUATOR AND DOWNSTOP STRIKER FITTING FOR A TILTROTOR AIRCRAFT

TECHNICAL FIELD

This disclosure relates in general to the field of aircraft and, more particularly, though not exclusively, to a conversion actuator and downstop striker fitting for a tiltrotor aircraft.

BACKGROUND

There are numerous considerations involved in the design of tiltrotor aircraft and other aircraft, including size, weight, power efficiency, fuel efficiency, noise, vibration, structural loads, and so forth. In many cases, however, it may be challenging to improve certain aspects of an aircraft without disrupting other aspects. For example, propulsion system design implicates numerous performance considerations and is often an extremely challenging aspect of aircraft design.

SUMMARY

According to one aspect of the present disclosure, a wing may be provided and may include an outboard rib; a proprotor gearbox, wherein the proprotor gearbox is located inboard of the outboard rib; a fitting attached to the proprotor gearbox; and a conversion actuator, wherein the conversion actuator is attached to the wing and is mechanically coupled to the fitting. The wing may further include a downstop striker in which the downstop striker may be mounted to the fitting and the downstop striker may be between the proprotor gearbox and the conversion actuator. The wing may further include a downstop mounted on a top side of the outboard rib, wherein the downstop and the downstop striker are aligned to be in contact when the proprotor gearbox is positioned in an airplane mode.

The downstop striker may include a thickness; a first end configured to be received in the downstop; a second end comprising a mounting slot that extends through the thickness; and a mounting hole that extends through the thickness and that is between the first end and the second end. The downstop striker may further include a first width at the mounting hole; a second width at the mounting slot; and a varying width between the mounting hole and the mounting slot. The fitting may further include a cavity between a forward side and an aft side of the fitting, wherein a downstop striker is mounted within the cavity.

In some cases, the fitting may further include at least one inboard attachment portion that is attached to the proprotor gearbox; and an outboard connection portion that aligns with an attachment element of the conversion actuator. In some instances the at least one inboard attachment portion may include a shear element that aligns with a recess within an attachment structure of the proprotor gearbox. The outboard connection portion may allow movement of the conversion actuator attachment element when the proprotor gearbox is moved between an airplane mode position and a helicopter mode position.

According to another aspect of the present disclosure, a tiltrotor aircraft may be provided and may include a fuselage; a wing, in which the wing may include an outboard rib; a proprotor gearbox, wherein the proprotor gearbox is located inboard of the outboard rib; a fitting attached to the proprotor gearbox; and a conversion actuator, wherein the conversion actuator is attached to the wing and is coupled to the fitting. The tiltrotor aircraft may further include a downstop striker in which the downstop striker may be mounted to the fitting and the downstop striker is between the proprotor gearbox and the conversion actuator. The downstop striker may be aligned to a downstop mounted on a top side of the outboard rib.

The fitting may further include at least one inboard attachment portion that is attached to the proprotor gearbox; and an outboard connection portion that aligns with an attachment element of the conversion actuator. The outboard connection portion allows movement of the conversion actuator attachment element when the proprotor gearbox is moved between an airplane mode position and a helicopter mode position.

According to another aspect of the present disclosure, a fitting for a proprotor gearbox may be provided and may include at least one inboard attachment portion to attach the fitting to the proprotor gearbox; and an outboard connection portion to mechanically couple a conversion actuator to the fitting. The fitting may further include a downstop striker mounted within a cavity of the fitting, wherein the downstop striker is located inboard of the outboard connection portion of the fitting.

The downstop striker may further include a first end configured to be received in a downstop; a second end comprising a mounting slot; a mounting hole that is between the first end and the second end; a first width at the mounting hole; a second width at the mounting slot; and a varying width between the mounting hole and the mounting slot. In some cases, the fitting may provide a first load path for loads received by the at least one inboard attachment portion that are to be absorbed, at least in part, through the downstop striker, and the fitting may provide a second load path for loads received by the outboard connection portion that are to be absorbed, at least in part, through the downstop striker. The outboard connection portion allows movement of a conversion actuator attachment element when the proprotor gearbox is moved between an airplane mode position and a helicopter mode position.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
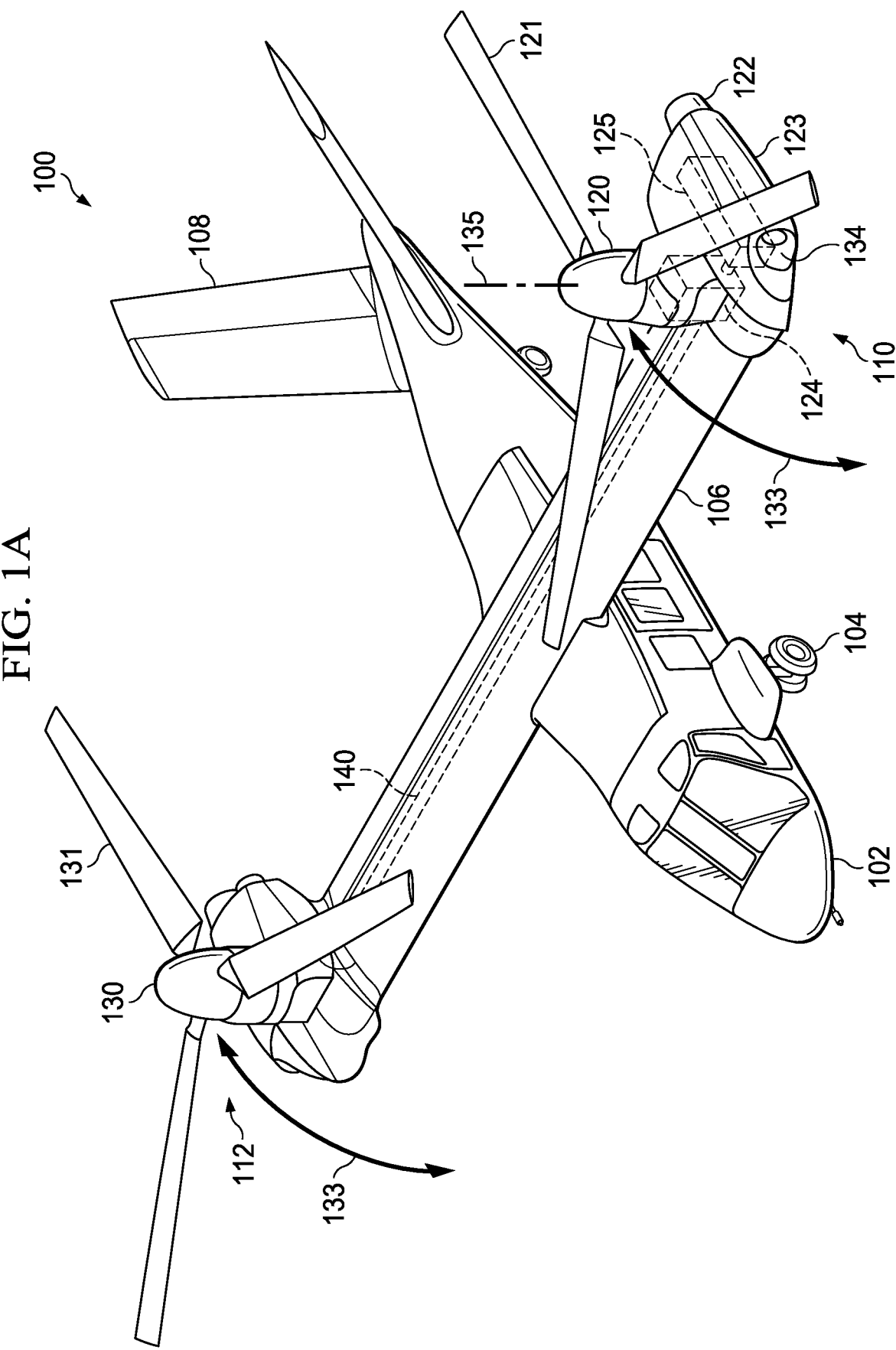
FIGS. 1A-1B are simplified schematic diagrams of an aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', 'beside', 'between', or other similar terms to describe spatial relationship(s) between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase 'between X and Y' represents a range that includes X and Y.

Further, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft relative to another component or component aspect, wherein the centerline runs in a between the front and the rear of the aircraft. The term 'outboard' may refer to a location of a component that is outside the fuselage of an aircraft and/or a spatial direction that farther from the centerline of the aircraft relative to another component or component aspect.

In addition, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGS.

Figure 1B:
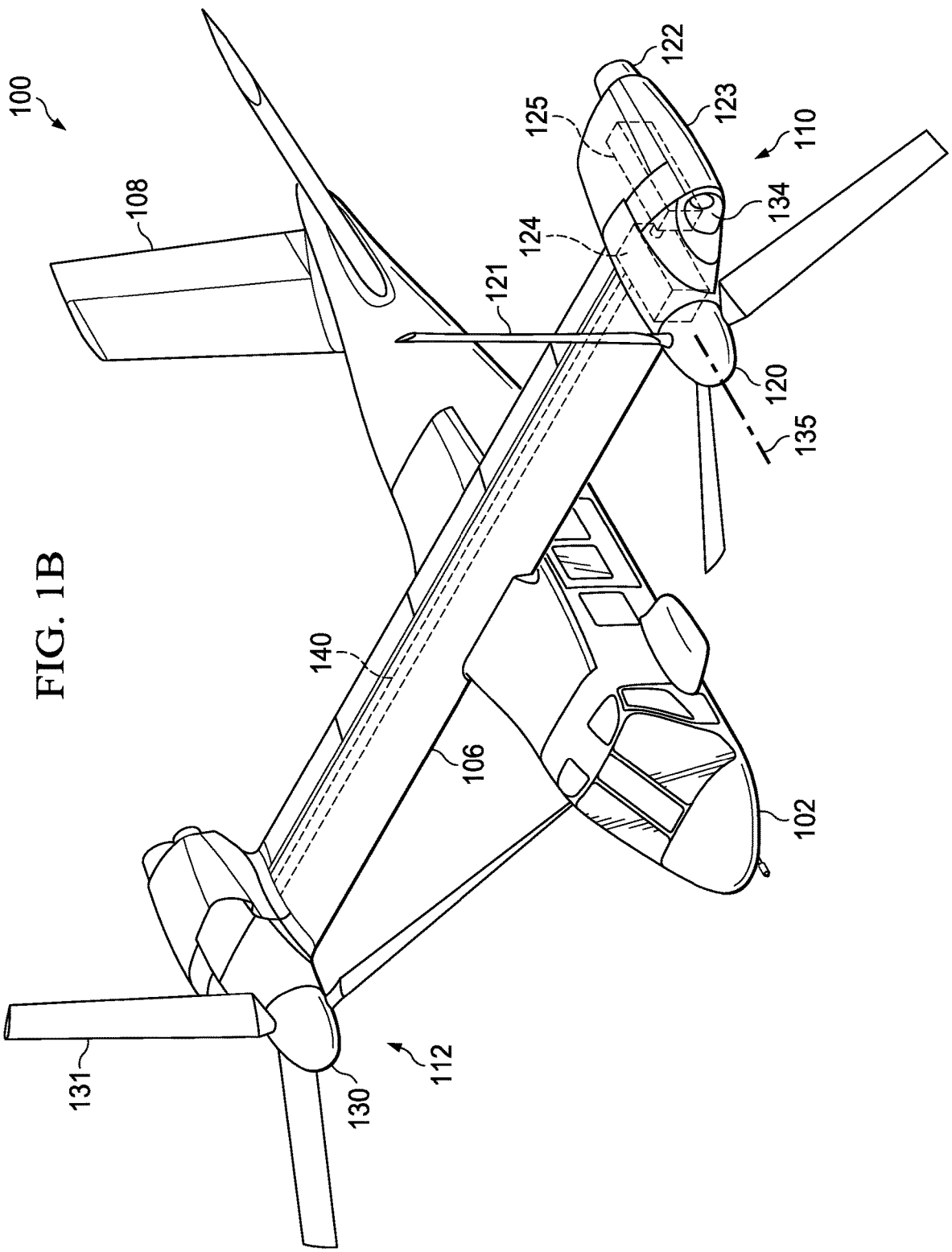

Referring to FIGS. 1A-1B, FIGS. 1A-1B illustrate perspective views of an example aircraft, which in this example is a tiltrotor aircraft 100. Tiltrotor aircraft 100 includes a fuselage 102, a landing gear 104, a wing 106, a tail member 108, a propulsion system 110, and a propulsion system 112. The fuselage 102 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 108 may be used as a vertical and a horizontal stabilizer.

Propulsion system 110 includes a proprotor 120 that includes a plurality of rotor blades 121. Propulsion system 112 includes a proprotor 130 that includes a plurality of rotor blades 131. The position of proprotors 120 and 130, as well as the pitch of rotor blades 121 and 131, can be selectively controlled in order to provide flight capabilities (e.g., flight direction, thrust, and/or lift) for tiltrotor aircraft 100.

The position of proprotors 120 and 130 are moveable between a helicopter mode position and an airplane mode position to provide different types of thrust for tiltrotor aircraft 100. FIG. 1A illustrates tiltrotor aircraft 100 proprotors 120 and 130 in a helicopter mode position in which proprotors 120 and 130 are positioned substantially vertical to provide a lifting thrust. FIG. 1B illustrates tiltrotor aircraft 100 in an airplane mode position in which proprotors 120 and 130 are positioned substantially horizontal to provide a forward thrust in which a lifting force is supplied by wing 106. It should be appreciated that tiltrotor aircraft can be operated such that proprotors 120 and 130 can be selectively positioned between airplane mode and helicopter mode positions, which can be referred to as a 'conversion mode', 'conversion mode positioning', or variations thereof.

Features of propulsion system 110 are substantially symmetric to features of propulsion system 112; therefore, for sake of efficiency certain features will be discussed only with regard to propulsion system 110. However, one of ordinary skill in the art would fully appreciate an understanding of propulsion system 112 based upon embodiments described herein for propulsion system 110.

Further, propulsion systems 110 and 112 are illustrated in the context of tiltrotor aircraft 100; however, propulsion systems 110 and 112 can be implemented on other tiltrotor aircraft. For example, an alternative embodiment may include a quad tiltrotor that has an additional wing member aft of wing 106 and the additional wing member may have additional propulsion systems similar to propulsion systems 110 and 112. In another embodiment, propulsion systems 110 and 112 can be used with an unmanned version of tiltrotor aircraft 100. Further, propulsion systems 110 and 112 can be integrated into a variety of tiltrotor aircraft configurations.

Various engine(s), gearbox(es), and drive shaft(s) may be provided in various configurations to provide torque to proprotors 120 and 130. For example, in at least one embodiment, propulsion system 110 may include an engine 122 within an engine nacelle 123. Engine 122 is mechanically coupled to a proprotor gearbox (PRGB) 124 via a fixed gearbox 125 to provide torque to proprotor 120 to facilitate various flight capabilities. Engine 122 may be housed and supported within engine nacelle 123. In at least one embodiment, engine nacelle 123 may include an inlet 134, aerodynamic fairings, and exhaust, as well as other structures and systems to support and facilitate the operation of engine 122.

Fixed gearbox 125 may include various gears, such as helical gears, in a gear train that are mechanically coupled to engine 122 and proprotor gearbox 124 (via other gears and/or gearboxes), as well as an interconnect drive shaft (ICDS) 140. The interconnect drive shaft 140 may provide a torque path that enables a single engine to provide torque to both proprotors 120 and 130 in the event of a failure of the other engine.

Figure 2:
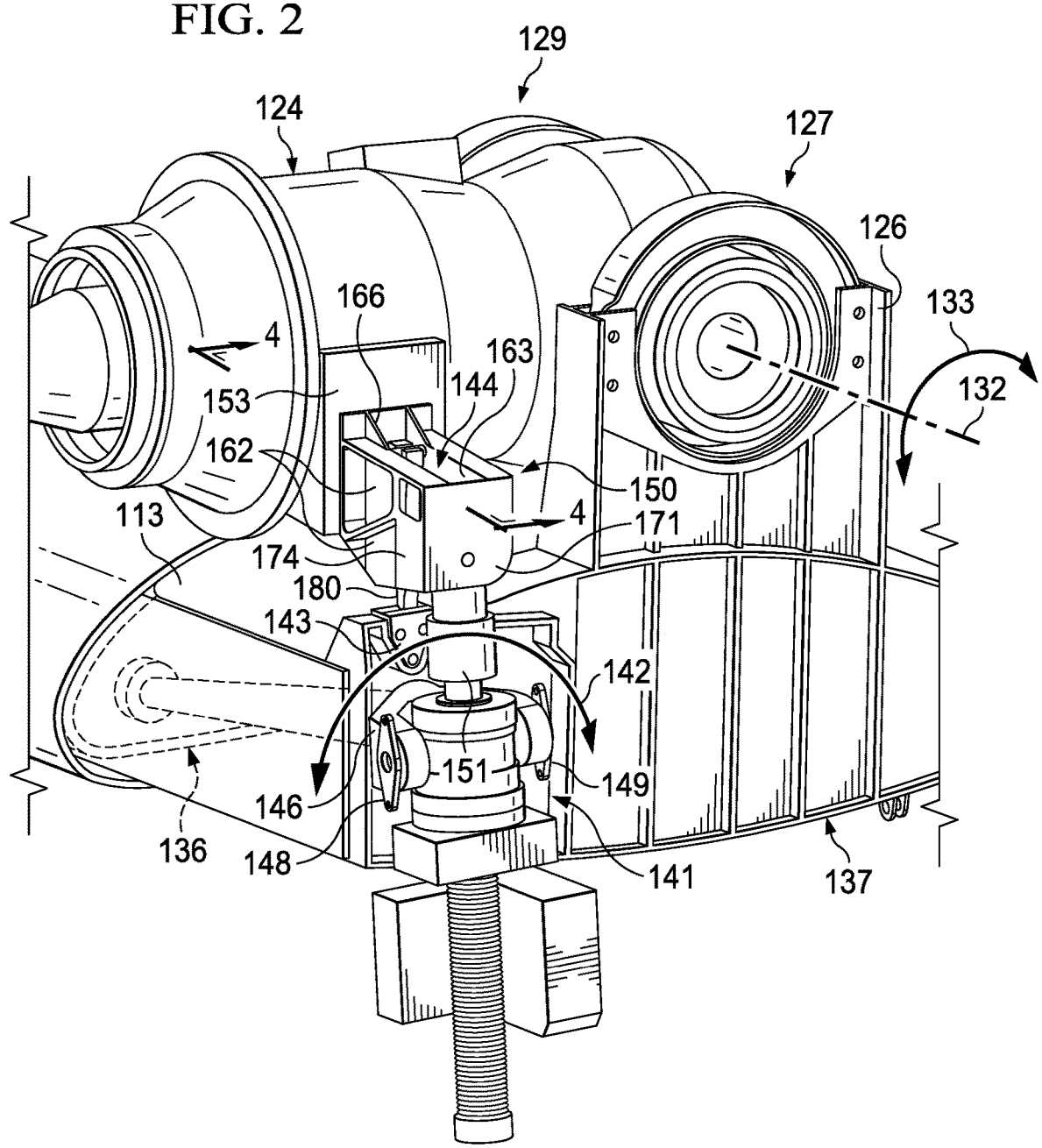
FIG. 2 is a partial perspective view diagram illustrating example details associated with a propulsion system of the aircraft, in accordance with certain embodiments.

Referring to FIG. 2, FIG. 2 is a partial perspective view diagram illustrating example details associated with propulsion system 110, in accordance with certain embodiments. As discussed previously, propulsion system 110 includes engine 122 mechanically coupled to proprotor gearbox 124 via fixed gearbox 125 to provide various flight capabilities for tiltrotor aircraft 100; however, engine 122 and fixed gearbox 125 are not shown in FIG. 2 in order to illustrate other features of tiltrotor aircraft 100.

Proprotor gearbox 124 is located above an upper skin 113 of a portion of wing 106, while also being approximately centered between an inboard rib 136 and an outboard rib 17 in a configuration sometimes referred to as a 'pylon-over-wing' configuration. In at least one embodiment, proprotor gearbox 124 may be mounted above upper skin 113 of wing 106 using an outboard pillow block 126, an outboard bearing assembly 127, an inboard pillow block 128 (shown at least in FIG. 6), and an inboard bearing assembly 129 (shown at least in FIG. 6). Thus, proprotor gearbox 124 is structurally supported but rotatable about a conversion axis (generally indicated by dashed-line 132) to allow the proprotor gearbox 124 to be rotated (generally indicated by arrows 133) between helicopter mode (as shown at least in FIG. 1A) and airplane mode positions (as shown at least in FIG. 1B and FIG. 2).

In at least one embodiment, outboard pillow block 126 may be structurally integrated with and/or otherwise structurally coupled to outboard rib 137. In at least one embodiment, inboard pillow block 128 may be structurally integrated with and/or otherwise structurally coupled to inboard rib 136. It is to be understood that the structural configuration for mounting proprotor gearbox 124 to wing 106 is implementation specific and that any combination of structural components may be used for such mounting depending on applications and/or implementations.

Propulsion system 110 may include other components including, but not limited to, a conversion actuator 141 (sometimes referred to as a pylon conversion actuator (PCA)), a downstop striker 180, a downstop 143, and a conversion actuator 141, and downstop striker fitting 150. As referred to herein in this Specification, conversion actuator and downstop striker fitting 150 may be referred to using the terms 'conversion actuator/striker fitting 150', 'fitting 150', and variations thereof. Further as referred to herein, 'downstop striker 180' may also be referred to as 'striker 180'.

Propulsion system 110 may include other components as would be appreciated by one of ordinary skill in the art to facilitate flight capabilities for tiltrotor aircraft 100; however, such components are not disclosed for sake of brevity only in order to discuss various features relating to fitting 150.

In accordance with embodiments described herein, fitting 150 is not integrally formed into proprotor gearbox 124; rather, fitting 150 may be mounted or otherwise attached to proprotor gearbox 124. Thus, fitting 150 is separate from any integrated casting features of proprotor gearbox 124. Fitting 150 may also provide features for mechanically coupling conversion actuator 141 to the fitting 150. In at least one embodiment, downstop striker 180 may be mounted to fitting 150 and downstop 143 may be mounted to an upper surface of outboard rib 137. In some embodiments, the arrangement of a downstop striker and downstop may be reversed. For example, in some embodiments, a downstop striker may be mounted to the wing and/or outboard rib 137 and a downstop or V-block may be mounted to or formed for fitting. This reversed arrangement offers an advantage of preventing debris collection in the downstop, which might prevent the downstop striker from seating correctly. In at least one embodiment, conversion actuator 141 may be a linear actuator, such as a telescoping ball screw; however, other conversion actuator types may be envisioned depending on applications and/or implementations.

During operation, conversion actuator 141 may be actuated (e.g., via a flight control system) so as to selectively rotate proprotor gearbox 124 about conversion axis 132 to selectively position proprotor 120 in airplane mode and helicopter mode positions.

Propulsion system 110 may be subjected to various aerodynamic and operational forces during operation such as thrust or torque loads, conversion actuator pre-load forces, aerodynamic shears, and so forth. Thrust or torque loads, for example, are forces produced by the rotation of proprotor 120 about a mast axis (generally indicated by dashed line 135) that is collinear with the rotational center of proprotor 120. In another example, when in airplane mode, conversion actuator 141 may provide a downward pre-load force that maintains the position of proprotor 120 in airplane mode.

In yet another example, operational failures and/or malfunctions of components may result in unintended forces being caused to propulsion system components. For example, conversion actuator 141 may malfunction in a 'worst-case' scenario and rather than applying nominal pre-load forces, which typically range between 2,000 pounds and 10,000 pounds of downward force, the conversion actuator may drive the downstop striker 180 into the downstop 143 at forces potentially order(s) of magnitude greater than nominal.

Thus, it is important to provide structural and mechanical support for components of propulsion system 110 to facilitate flight capabilities for tiltrotor aircraft 100. Design of components that are used to provide structural and mechanical support for a propulsion system (e.g., propulsion system 110) can implicate numerous considerations (e.g., performance considerations, manufacturing considerations, etc.) such as weight, failure, 'worst-case', damage or wear rate, cost, part count, among others, and can be a challenging aspect of tiltrotor aircraft design.

Fitting 150 may provide various structural and mechanical features for propulsion system 110 in accordance with various embodiments described herein. In at least one embodiment, fitting 150 may facilitate mechanically coupling conversion actuator 141 to proprotor gearbox 124 to facilitate conversion mode positioning of proprotor gearbox 124 in helicopter mode and aircraft mode positions. In at least one other embodiment, fitting 150 may facilitate a downstop 143/downstop striker 180 configuration in which the downstop 143 may be mounted to an upper surface of outboard rib 137 and downstop striker 180 may be mounted to fitting 150 using various fasteners 152. In at least one embodiment, the configuration may provide for aligning downstop striker 180 and downstop 143 along both forward-to-aft and inboard-to-outboard directions to allow downstop striker 180 to be driven into and held downstop 143 (e.g., at a given pre-load force) when the proprotor 120 is positioned in airplane mode.

In accordance with embodiments described herein, fitting 150 may provide numerous technical advantages over other potential conversion actuator coupling configurations and over other potential downstop/downstop striker configurations. For tiltrotor aircraft 100, conversion actuator 141 may be mounted to wing 106 at a location that is outboard of the proprotor gearbox mast axis 135 using a lower mounting assembly 145 that is mechanically coupled to a spindle mount 146. Conversion actuator 141 may be mechanically coupled to fitting 150 using a rod-end socket-style upper attachment element 151 that is secured to fitting 150 using at least one fastener 152. In at least one embodiment, a spherical bearing 142 (as shown at least in FIG. 4) may be seated in the upper attachment element 151.

Spindle mount 146 may be mounted to outboard rib 137 and inboard rib 136 using various bearing assemblies (not shown) that allow the spindle mount 146 and conversion actuator 141 to rotate along forward-to-aft directions (generally indicated by arrows 147) during operation. Lower mounting assembly 145 may be mechanically coupled to spindle mount 146 using a forward bearing assembly 148 and an aft bearing assembly 149 that allow the conversion actuator 141 to tilt along inboard-to-outboard directions (generally indicated by arrows 159 as shown at least in FIG. 3) during operation.

Some other configurations for mechanically coupling a conversion actuator to a proprotor gearbox include using two spindle mounts, such as a lower spindle mount and an upper spindle mount; however, each spindle mount may be significantly heavier than embodiments discussed herein in which fitting 150 may be utilized. In contrast, fitting 150 may weigh approximately 10 pounds (e.g., between 5 pounds and 20 pounds), in some embodiments; however, other weights can be envisioned that may still be significantly lighter than arrangements utilizing two spindle mounts for conversion actuator mounting. Thus, at least one advantage of the configuration provided by fitting 150 may include a significant weight savings over configurations that use two spindle mounts for conversion actuator mounting.

Further, by utilizing fitting 150, the design and/or manufacture of proprotor gearbox 124 may be improved (e.g., it may be a simpler design, it may have a lower part count, it may be lighter, etc.) in comparison to a configuration that utilizes an upper spindle mount, which typically involves a complex arrangement of structural components provided for a proprotor gearbox that are used to attach the upper spindle mount and its associated bearing assemblies to the proprotor gearbox.

In addition, downstop 143/downstop striker 180 configuration facilitated by fitting 150 may provide certain advantages over other potential downstop/downstop striker configurations. For example, some downstop/downstop striker configurations involve mounting a downstop along the forward side of the outboard rib, which not only results in an increased part count for such mounting in comparison to the downstop mounting configuration provided by tiltrotor aircraft 100, but also results in a cantilevered structure that causes downward torsional forces to be applied to the forward side of the wing/outboard rib; which further increases the part count for additional structural and mechanical support structures to support such forces. At least one advantage of the configuration provided by fitting 150 provides for driving pre-load forces directly into the outboard rib 187, which may not only eliminate cantilevered forces being driven along the forward side of the outboard rib, but may also reduce part count and/or weight in comparison to other configurations.

Accordingly, fitting 150 may provide various structural and/or mechanical features integrated together into a unitary component, which may provide numerous technical advantages over other conversion actuator mechanical coupling configurations and downstop/downstop striker configurations. Other advantages that may be provided by fitting 150 are discussed herein, below.

Figure 3:
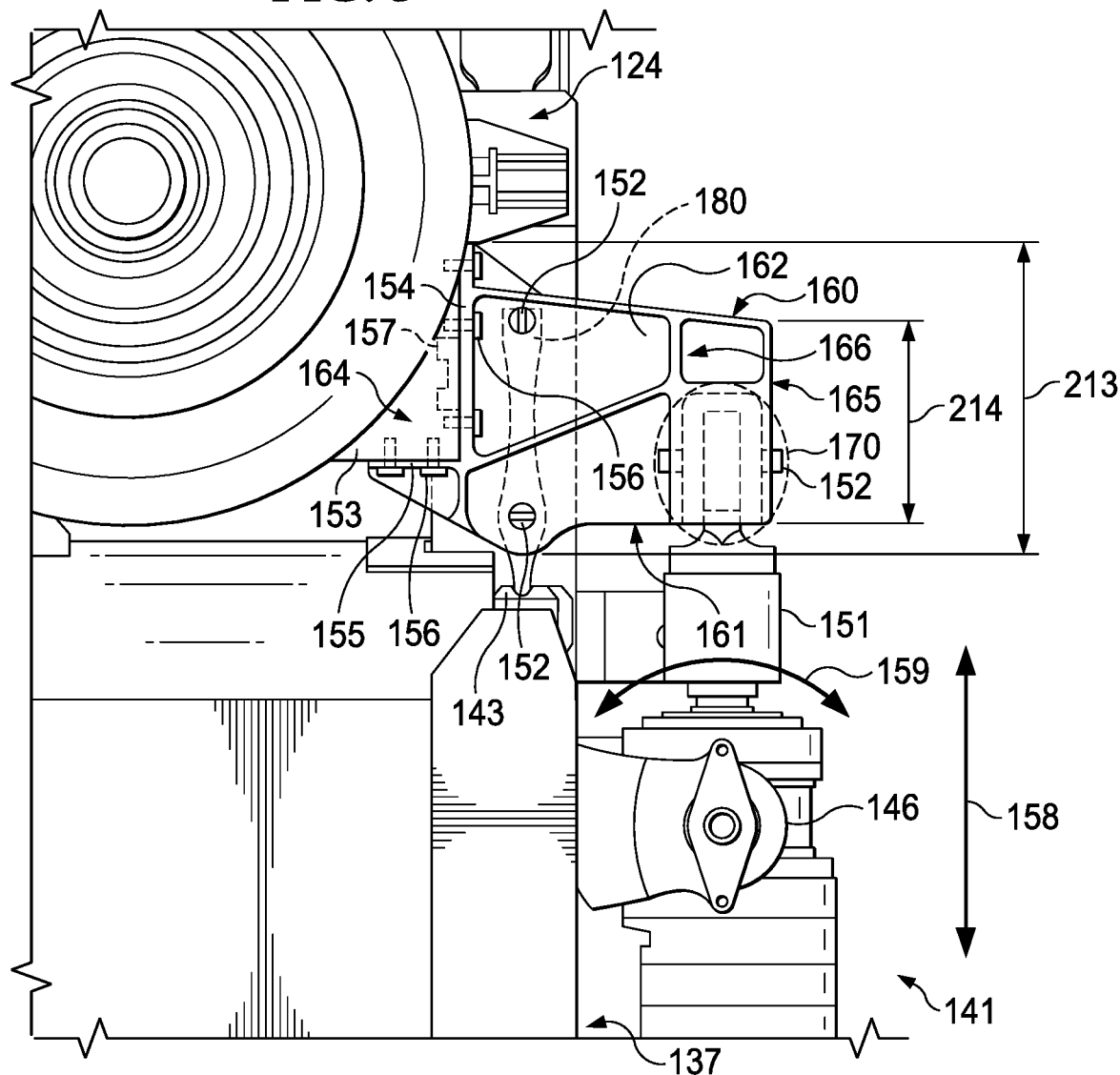
FIGS. 3-7 are simplified diagrams illustrating example details associated with a conversion actuator and downstop striker fitting, in accordance with certain embodiments.
Figure 4:
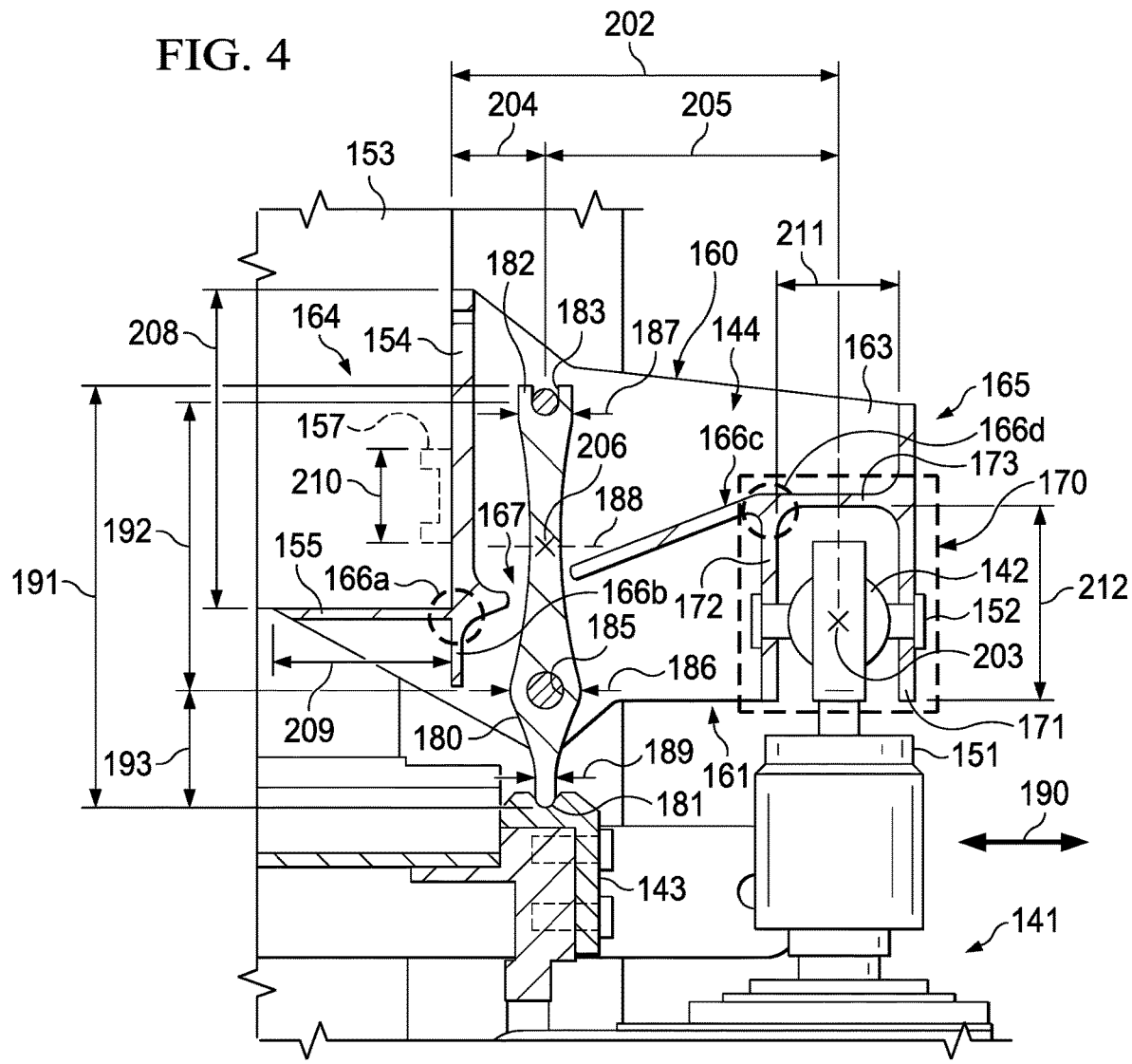
Figure 5:
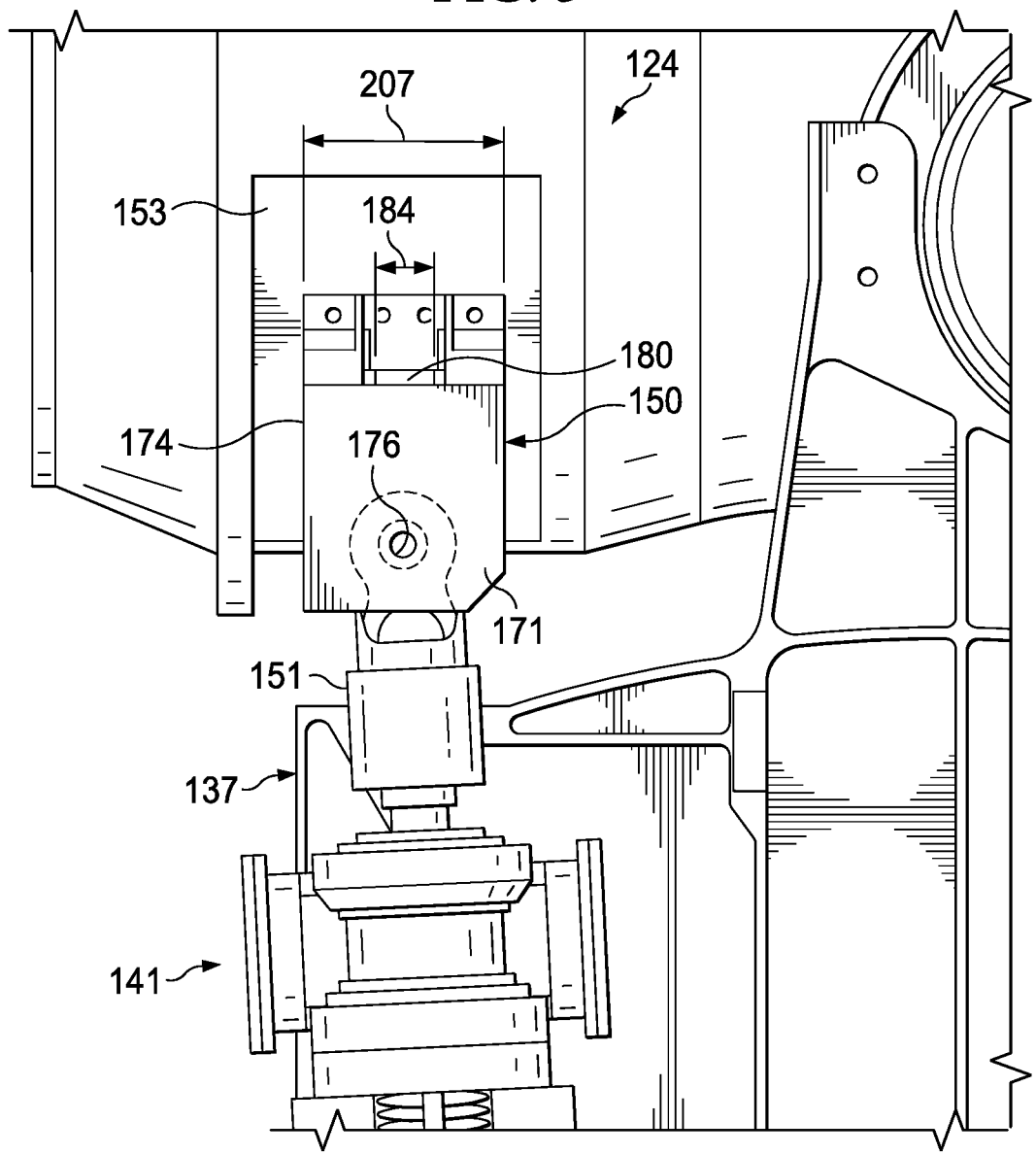
Figure 6:
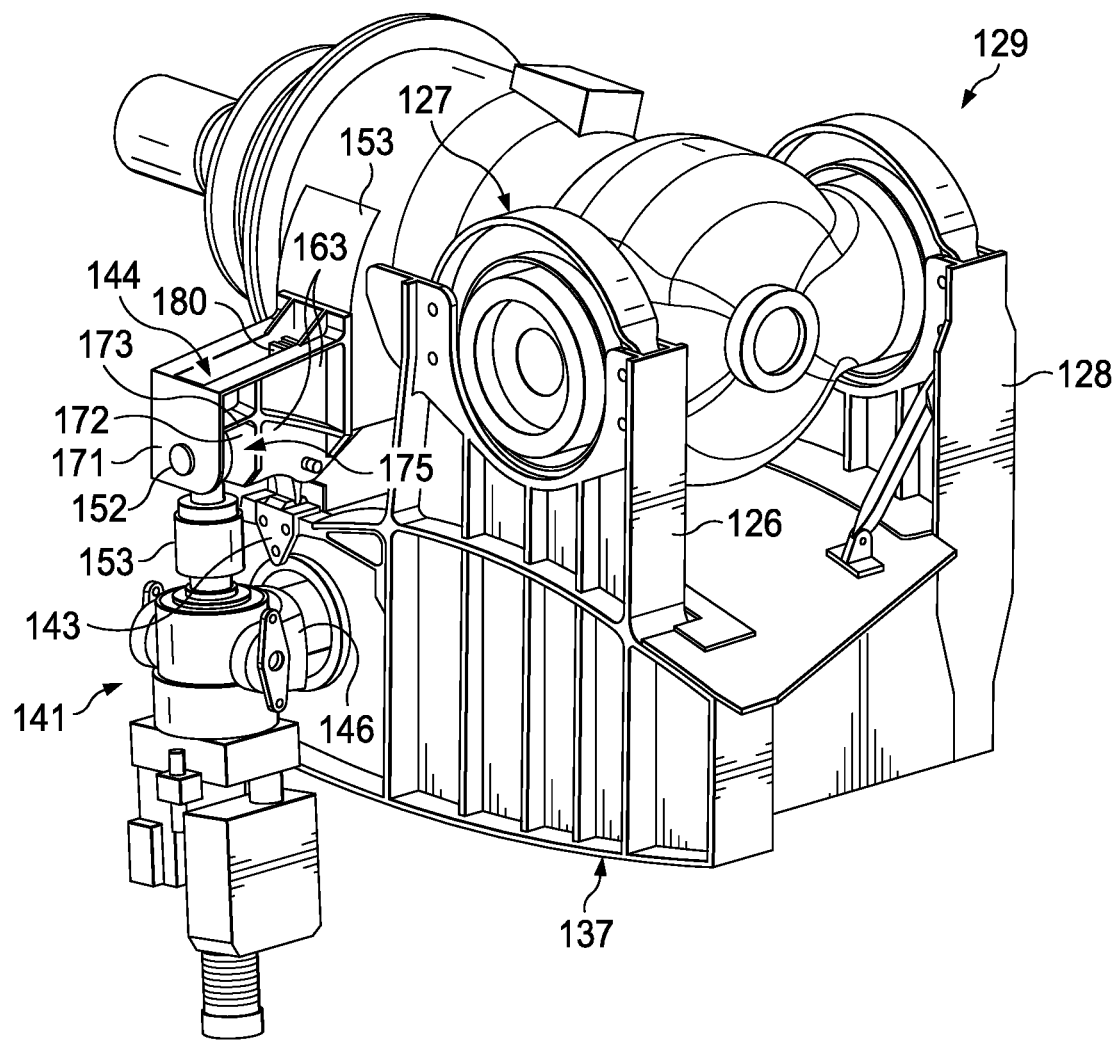
Figure 7:
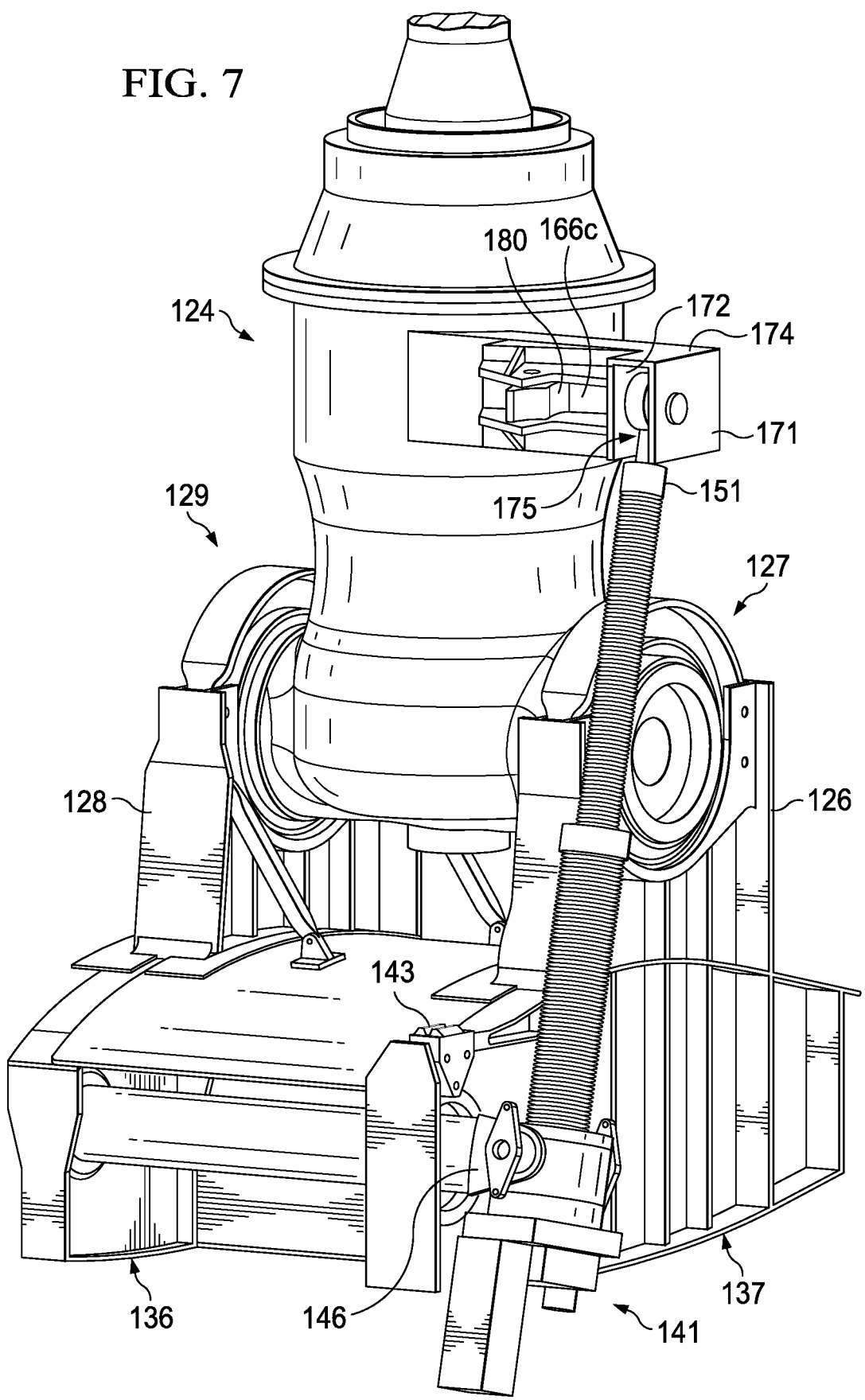

Referring now to FIGS. 3-7, features of fitting 150 are discussed in further detail. FIG. 3 is a simplified side view diagram (from a forward perspective) illustrating other example details associated with fitting 150. FIG. 4 is a simplified side, cross-sectional view diagram (from a forward perspective) illustrating yet other example details associated with fitting 150. The cross-section of FIG. 4 is cut along a line as generally indicated by the lines labeled '4' in FIG. 2. FIG. 5 is a simplified side view diagram (from an outboard perspective) illustrating yet other example details associated with fitting 150. FIG. 6 is a simplified perspective view diagram (from an aft perspective) illustrating yet other example details associated with fitting 150. FIG. 7 is a simplified perspective view diagram (from a forward perspective) illustrating yet other example details associated with fitting 150.

Fitting 150 may include various structural features including, but not limited to, a top side 160, a bottom side 161, a forward side 162, an aft side 163, an inboard side 164, and an outboard side 165. Fitting 150 may also include a various structural support elements 166, that may be integrated into, within, along, on, etc. one or more sides of the fitting 150 to provide structural rigidity and/or strength for fitting 150 to support various operational and/or aerodynamic loads that may occur during operation of tiltrotor aircraft 100. It is to be understood that, except as otherwise noted for various embodiments described herein, structural support elements 166 may have any suitable forms, dimensions (e.g., thickness, length, etc.), orientations, etc. to provide structural rigidity and/or strength for fitting 150 to support various operational and/or aerodynamic loads during operation.

In at least one embodiment, fitting 150 may be mounted or otherwise attached to an attachment structure 153 that is integrated into proprotor gearbox 124 using, at least in part, a first inboard attachment portion 154 and a second inboard attachment portion 155 that may be integrally formed for the inboard side 164 of fitting 150. It is to be understood that the structural configuration attachment structure 153 is implementation specific and that any structure and/or structural components may be provided for an attachment structure of proprotor gearbox to facilitate mounting a conversion actuator/downstop striker fitting thereto depending on applications and/or implementations.

In at least one embodiment, the first inboard attachment portion 154 may have a vertical orientation to vertically align with and mate to a vertical side of the attachment structure 153 and the second inboard attachment portion 155 may have a horizontal orientation to horizontally align with and mate to a bottom (horizontal) side of the attachment structure 153; however, other orientations of fitting 150 inboard attachment portions can be envisioned in other embodiments, depending on the geometric design of the attachment structure 153 and/or the fitting 150. For example, in some embodiments, at least one inboard attachment portion may be provided for a conversion actuator/striker fitting that may have neither an approximately vertical nor an approximately horizontal orientation, but instead may have an angled orientation that may mate with an attachment structure for a given proprotor gearbox.

In some embodiments, the first and second inboard attachment portions 153, 154 may include holes through which attachment devices 156 may be used to attach the fitting to the attachment structure 153 of the proprotor gearbox 124; however, other attachment mechanism(s) can be envisioned. For example, in some embodiments attachment devices could be integrated into the attachment structure 153 that could align with holes of the fitting 150 and the fitting 150 could be secured to the proprotor gearbox using pins, nuts, etc. Thus, fitting 150 may be mounted or otherwise attached to proprotor gearbox 124 using any appropriate attachment mechanism(s). Note, attachment devices 156 are not illustrated in some of the FIGS. in order to illustrate other features.

In at least one embodiment, first inboard attachment portion 154 may be formed to include a shear boss 157 integrated therein. Shear boss 157 may be a cylindrical-shaped structure that is integrated into the first inboard attachment portion 154 and is to mate with cylindrical-shaped sleeve (not shown) provided for the attachment structure 153 to provide additional structural support for fitting 150 to support vertical loads and/or forces (generally indicated by arrows 158) that may be caused by proprotor gearbox 124 among various conversion mode positions.

The first inboard attachment portion 154 and the second inboard attachment portion 155 may meet and be structurally integrated together at cornered structural element 166a (as shown at least in FIG. 4) for the fitting 150. Thus, the first inboard attachment portion 154 and the second inboard attachment portion 155 are integrated together for fitting 150 to further support vertical and/or horizontal loads that may be caused by the proprotor gearbox 124. In some embodiments, a vertical structural element 166b may extend downward from the cornered structural element 166a toward the bottom side 161 of the fitting 150 between the forward side 162 and the aft side 163 to provide additional structural support for the fitting 150.

Although two inboard attachment portions are illustrated for various embodiments described herein, it is to be understood that any number of inboard attachment portions may be configured for a conversion actuator/striker fitting (e.g., fitting 150) to facilitate mounting or otherwise attaching the fitting to a proprotor gearbox (e.g., proprotor gearbox 124 and, thus, are clearly within the scope of the present disclosure.

Conversion actuator 141 may be mechanically coupled to fitting 150 using an outboard connection portion 170 of the fitting 150 and at least one fastener 152. The outboard connection portion 170 may be structurally integrated into the fitting 150 and may include an enclosed outer (outboard) side 171, an enclosed inner (inboard) side 172, an enclosed top side 173, and an enclosed forward side 174 and may be open (as shown at least in FIG. 6) along the bottom side 161 and the aft side 163 of the fitting 150. The enclosed outer side 171 of the outboard connection portion 170 may be a part of and structurally integrated with the outboard side 165 of the fitting 150. The fastener 152 may extend laterally through: a hole 176 (as shown at least in FIG. 5) of the enclosed outer side 171 (fastener 152 is not shown in FIG. 5), spherical bearing 142 of the upper attachment element 151, and a corresponding hole (not labeled) of the enclosed inner side 172 to secure the conversion actuator 141 to the fitting 150. It is to be understood that the position of the holes for the enclosed outer side 171 and the enclosed inner side 172 are implementation specific and may be adjusted based on the dimensions of the upper attachment element 151 of the conversion actuator 141 and/or the dimensions of the fitting 150 depending on various applications and/or implementations.

In essence, the outboard connection portion 170 may be a structural feature in which an open area 175 (as shown at least in FIG. 6) is provided by the fitting 150 that may be aligned with the upper with the upper attachment element 151 to facilitate a means to mechanically couple the conversion actuator 141 to the fitting 150 and to allow the conversion actuator 141 upper attachment element 151 to freely rotate (147) via the open bottom and aft sides of the fitting 151 as the proprotor gearbox 124 is transitioned between airplane mode and helicopter mode positions. FIG. 7 illustrates example details associated with fitting 150 when the proprotor gearbox 124 is positioned in helicopter mode.

As illustrated in FIG. 7, the open area 175 allows the upper attachment element 151 to freely rotate through the open bottom and aft sides and be positioned through the open aft side of the outboard connection portion 170 of the fitting 150 when proprotor gearbox 124 is positioned in a helicopter mode position.

Referring again to FIG. 4, the enclosed top side 172 and the enclosed inner side 171 of the outboard connection portion 170 may meet and be structurally integrated together with a diagonal structural element 166c at an internal structural element 166d of the fitting 150. Diagonal structural element 166c may extend between the internal structural element 166d and the cornered structural element 166a.

In at least one embodiment, downstop striker 180 (as shown at least in FIG. 4) may be mounted to fitting 150 by mounting the striker 180 within the cavity 144 of fitting 150 and securing the striker 180 within the cavity 144 using at least two fasteners 152 that each extend through corresponding holes (not labeled) provided in the forward side 162 and the aft side 163 of fitting 150. It is to be understood that the position of the holes for the forward side 162 and the aft side 163 are implementation specific and may be adjusted based on the dimensions of the striker 180 and/or the dimensions of the fitting 150 depending on various applications and/or implementations.

Diagonal structural element 166c may include an opening 167 through which the striker 180 extends within the cavity 144 of the fitting 150. Downstop striker 180 may have a first end 181 and a second end 182 and may be mounted to fitting 150 in a vertical orientation in which the first end 181 represents the end of the striker 180 that is to be received by and in contact with downstop 143 when proprotor gearbox 124 is in the airplane mode position. The second end 182 of striker 180 may include a mounting slot 183 in which the slot extends through a thickness 184 (along forward-to-aft directions) of the striker 180. The striker may also include a mounting hole 185 that extends through the thickness 184 and is between the first end 181 and the second end 182. The mounting hole 185 may be positioned to be closer to the bottom side 161 of the fitting 150 when the striker 180 is mounted within the fitting 150. It is to be understood that the position of the mounting slot 183 and the mounting hole 185 for the striker 180 are implementation specific and may be adjusted based on the dimensions of the striker 180 and/or the dimensions of the fitting 150 depending on various applications and/or implementations.

An upper fastener 152 may be inserted through the mounting slot 183 and a lower fastener 152 may be through the mounting hole 185 to secure the striker 180 within the cavity 144 of the fitting 150.

In at least one embodiment, the striker 180 may have a first width 186 (along inboard-to-outboard directions) at the mounting hole 185 and a second width 187 at the mounting slot 183 in which the first width 186 is greater than the second width 187. The striker 180 may have a varying width between the mounting hole 185 and the mounting slot 183 such that the width of the striker 180 between the mounting hole 185 and the mounting slot 183 may be smallest at a location that is proximate to the midpoint between the hole and the slot (generally indicated by dashed-line 188). The striker 180 may also have a varying width between the mounting hole 185 and the first end 181 such that the width decreases to a third width 189 at the first end 181 of the striker 180. In at least one embodiment, the third width 189 may be less than the second width 187.

In at least one embodiment, the opening 167 of the diagonal structural element 166c may be suitably sized based on the thickness 184 and at least the second width 187 of the striker 180 to allow the striker 180 to be mounted within the cavity 144 of the fitting. For example, in at least one embodiment, the second end 182 of the striker 180 may be inserted up into the cavity 144 and through the opening 167 via the bottom side 161 of the fitting 150 and can be mounted within the cavity 144 using fasteners 152. In some embodiments, the opening 167 may be sized to allow the striker 180 to pass through the opening 167 while maintaining structural rigidity and/or integrity of the fitting 150.

The mounting slot 183 and the mounting hole 185 may be suitably sized to allow the striker to pivot laterally about the fasteners 152 (e.g., the slot and hole may have diameters slightly larger than the diameter of the fasteners 152). The varying width of the of the striker 180 allows the striker to provide a spring-action between the mounting slot 183 and the mounting hole 185 and between the mounting hole 185 and the first end 181 for the striker 180 to buffer or otherwise absorb inboard-outboard lateral movements (generally indicated by arrows 190) such as vibrations, wobbling, etc. that may be caused during operation of tiltrotor aircraft 100. Thus, downstop striker 180 may have a very high in-plane (vertical) stiffness to support vertical pre-load forces caused by conversion actuator 141 as well as vertical loads caused by the proprotor gearbox 124 and the striker 180 may have a softer out-of-plane (lateral) stiffness to absorb lateral movements that may be caused by operational and/or aerodynamic forces during operation. The striker 180 may have an overall length 191, which may include a first length 192 between the mounting slot 183 and the mounting hole 185 and a second length 193 between the mounting hole 185 and the first end 181. In various embodiments, the first length 192, the second length 193, the first width 186, the second width 187, the third width 189, and/or the varying widths of the striker 180 can be adjusted to tune the lateral stiffness of the striker 180 to have different spring rates depending on various applications and/or implementations (e.g., different spring rates for different tiltrotor aircraft, among others). In various embodiments, the overall length 191 may be less than 12 inches with the first length 192 and the second length 193 being less than the overall length 191 while the first width 186, the second width 187, and the third width 189 may each be less than an inch up to several inches in order to tune the lateral stiffness of the striker for vibrations and/or loads that may be expected during operation.

Fitting 150 and downstop striker 180 may have any suitable dimensions in accordance with various embodiments described herein. For example, in at least one embodiment, fitting 150 may have an overall length 201, which may be several inches up to greater than 10 inches, and a first height 213 (as measured relative to the inboard side 164 of the fitting), which may be several inches up to greater than 10 inches, and a second height 214 (as measured relative to the outboard side 165 of the fitting 150), which may range be several inches up to greater than 10 inches. It is to be understood that any dimensions can be envisioned depending on various applications and/or implementations. In at least one embodiment, an actuator coupling distance 202 between the first inboard attachment portion 154 of the fitting 150 and a vertical centerline (generally indicated by crosshair 203) of the conversion actuator 141 upper attachment element 154 may be approximately 9 inches. The actuator coupling distance 202 may be composed of a first distance 204 between the first inboard attachment portion 154 and a vertical centerline (generally indicated by crosshair 206) of downstop striker 180 and a second distance 205 between the vertical centerline (203) of the conversion actuator 141 upper attachment element.

In various embodiments, the first distance 204 and the second distance 205 may range between several inches and tens of inches to provide different actuator coupling distances 202, which may be varied depending on applications and/or implementations. For example, in some embodiments, the conversion actuator 141 may be mounted nearer to outboard rib 137 and/or in-line with outboard rib 137, which may result in a shortened actuator coupling distance 202. By shortening the actuator coupling distance 202, the moment arm of the fitting 150 for the actuator coupling distance 202 can be reduced (e.g., for conversion mode positioning movements); thereby reducing the loads that may be caused on fitting 150. By shortening the second distance 205, the moment arm for the second distance 205 can be reduced (e.g., for pre-load forces caused by the conversion actuator 141); thereby also reducing the loads that may be caused on the fitting. Reducing the coupling distance 202 may also provide for reducing the weight of fitting 150, which may improve performance for tiltrotor aircraft. In various embodiments, the fitting 150 may have a thickness 207 (as shown in FIG. 5) that may be less than or equal to a standard 6 inch billet thickness; however, other thicknesses 207 may be envisioned depending on applications and/or implementations.

In various embodiments, the first inboard attachment portion 154 may have a vertical length 208 that may be several inches up to greater than 10 inches and the second inboard attachment portion 155 may have a horizontal length 209 that may be less than 10 inches. In various embodiments, shear boss 157 may have a diameter 210 that may be several inches. The open area 175 of the outboard connection portion 170 may be a composed of a first dimension 211 as measured between the inner enclosed side 172 and the outer enclosed side 171 and a second dimension 212 as measured between the top enclosed side 172 and the bottom side 161 of the fitting. In various embodiments, the first dimension 211 may be several inches and the second dimension 212 may be several inches. It is to be understood that any dimensions can be envisioned depending on applications and/or implementations (e.g., different conversion actuator end styles, sizes, etc.).

In various embodiments, fasteners 152 may be any combination of pins, clips (e.g., cotter pins, cotter clips, retaining clips, etc.), bolts, threaded and/or unthreaded studs, combinations thereof, or the like to provide a means for coupling, attaching, mounting, securing, etc. one or more devices (e.g., conversion actuator 141, downstop striker 180, etc.) to fitting 150. In various embodiments, fasteners 152 may be the same or different depending on implementation and/or application. In various embodiments, attachment devices 156 may be any combination of pins, clips, (e.g., cotter pins, cotter clips, retaining clips, etc.), bolts, threaded and/or unthreaded studs, combinations thereof, or the like to provide a means for mounting or otherwise attaching fitting 150 to proprotor gearbox 124. In various embodiments, attachment devices 156 may be the same or different.

Fitting 150 and downstop striker 180 may be made of any suitable material in accordance with embodiments described herein. For example, in various embodiments, fitting 150 may be made of metal (e.g., aluminum, steel, titanium, etc.) and/or metal alloys, composite materials, reinforced composite materials (e.g., carbon fiber reinforced polymer (CFRP) composites), combinations thereof, or the like.

Figure 8A:
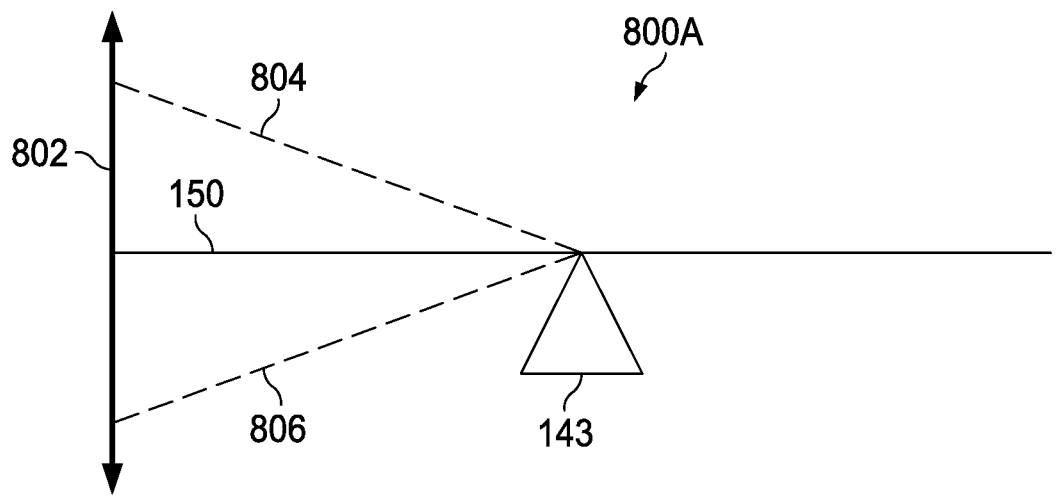
FIGS. 8A-8B are example free body load diagrams that may be associated with an example embodiment of the conversion actuator and downstop striker fitting.
Figure 8B:
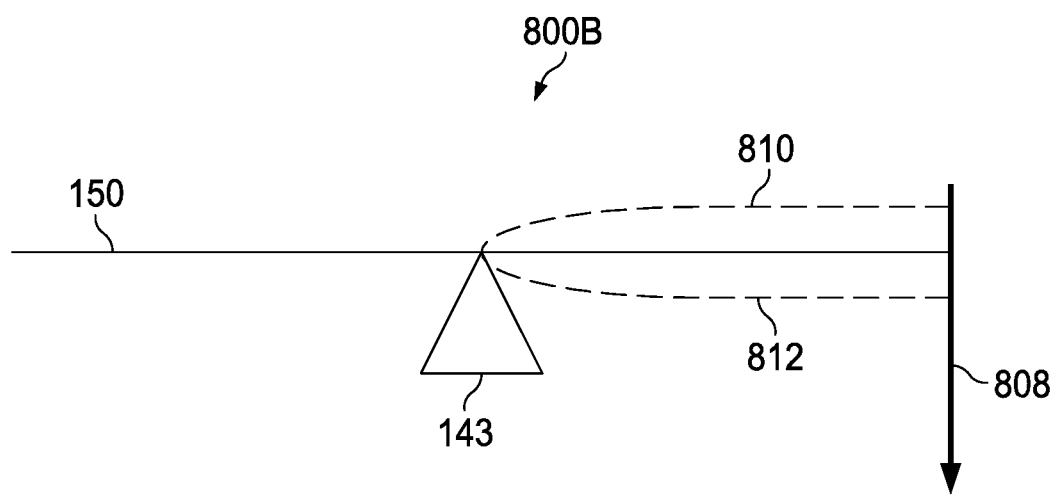

Referring to FIGS. 8A-8B, FIGS. 8A-8B are example free body loads diagram 800A-800B that may be associated with an example embodiment the conversion actuator and downstop striker fitting 150. The free body load diagrams 800A-800B are displayed using an X-Y coordinate system in which the Y-axis represents vertical loads that may be caused to fitting 150 and the X-axis is a straight line representation of fitting 150.

As shown in FIG. 8A, when in airplane mode position, proprotor gearbox 124 may cause vertical loads 802 (e.g., torque loads such as oscillatory rotor loads, etc.) that are transferred through a first load path provided by the fitting 150 (as indicated by dashed lines 804 and 806 representing load magnitudes) to be driven (via downstop striker 180, not shown in FIG. 8) into downstop 143 and reacted (absorbed) through downstop 143 (represented by the triangle shown in FIG. 8) and into the outboard rib 137. Loads 802 may be transferred through fitting 150 vertically and laterally via load paths 804 and 806 and may be dampened at the downstop interface such that the loads may not extend past the downstop 143 to the conversion actuator 141. The taper of load paths 804 and 806 from the proprotor gearbox interface toward downstop 143 indicates that load is being taken out through fitting 150 with no load in the fitting at the point the downstop is reached. The orientation of the downstop striker 180/downstop 143 being between the proprotor gearbox 124 and the conversion actuator 141 for fitting 150 may advantageously provide for the reduction of oscillatory rotor loads from being driven into the conversion actuator 141, which may reduce wear on the conversion actuator 141 and potentially extend its service life.

As shown in FIG. 8B, when in airplane mode position, conversion actuator 141 may cause vertical loads 808 (e.g., pre-load forces) that are transferred through a second load path provided by the fitting 150 (as indicated by dashed lines 810 and 812 representing load magnitudes) to be driven (via downstop striker 180) into downstop 143 and reacted (absorbed) through downstop 143 (the triangle) and into the outboard rib 137. Loads 808 may be transferred through fitting 150 vertically and laterally via load paths 810 and 812 and may be dampened at the downstop interface such that the loads may not extend past the downstop striker to the proprotor gearbox interface. Thus, the orientation of the downstop striker 180/downstop 143 being between the proprotor gearbox 124 and the conversion actuator 141 for fitting 150 may further advantageously provide for reducing conversion actuator loads 808 from being driven into the proprotor gearbox, which may reduce wear on the gearbox and potentially extend its service life, and/or may reduce part count, complexity, weight, or the like for the design of the gearbox.

The diagrams in the FIGURES illustrate the architecture, functionality, method(s), and/or operation(s) of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Moreover, as used herein, the term 'when' may be used to indicate the temporal nature of an event. For example, the phrase 'event 'A' occurs when event 'B' occurs' is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A wing comprising:
   an outboard rib;
   a proprotor gearbox, wherein the proprotor gearbox is located inboard of the outboard rib;
   a fitting attached to the proprotor gearbox; and
   a conversion actuator, wherein the conversion actuator is attached to the wing and is mechanically coupled to the fitting;
   wherein the fitting further comprises:
      at least one inboard attachment portion that is attached to the proprotor gearbox; and
      an outboard connection portion that aligns with an attachment element of the conversion actuator.

2. The wing of claim 1, further comprising:
   a downstop striker, wherein the downstop striker is mounted to the fitting and the downstop striker is between the proprotor gearbox and the conversion actuator.

3. The wing of claim 2, further comprising:
   a downstop mounted on a top side of the outboard rib, wherein the downstop and the downstop striker are aligned such that they are in contact when the proprotor gearbox is positioned in an airplane mode.

4. The wing of claim 2, wherein the downstop striker comprises:
   a thickness;
   a first end configured such that it is received in the downstop;
   a second end comprising a mounting slot that extends through the thickness; and
   a mounting hole that extends through the thickness and that is between the first end and the second end.

5. The wing of claim 4, wherein the downstop striker further comprises:
   a first width at the mounting hole;
   a second width at the mounting slot; and
   a varying width between the mounting hole and the mounting slot.

6. The wing of claim 1, wherein the at least one inboard attachment portion comprises a shear element that aligns with a recess within an attachment structure of the proprotor gearbox.

7. The wing of claim 1, wherein the outboard connection portion allows movement of the conversion actuator attachment element when the proprotor gearbox is moved between an airplane mode position and a helicopter mode position.

8. The wing of claim 1, wherein the fitting further comprises:
   a cavity between a forward side and an aft side of the fitting, wherein a downstop striker is mounted within the cavity.

9. A tiltrotor aircraft comprising:
   a fuselage;
   a wing, the wing comprising:
      an outboard rib;
      a proprotor gearbox, wherein the proprotor gearbox is located inboard of the outboard rib;
      a fitting attached to the proprotor gearbox; and
      a conversion actuator, wherein the conversion actuator is attached to the wing and is coupled to the fitting;
   wherein the fitting comprises:
      at least one inboard attachment portion that is attached to the proprotor gearbox; and
      an outboard connection portion that aligns with an attachment element of the conversion actuator.

10. The tiltrotor aircraft of claim 9, further comprising:
    a downstop striker, wherein the downstop striker is mounted to the fitting and the downstop striker is between the proprotor gearbox and the conversion actuator.

11. The tiltrotor aircraft of claim 10, wherein the downstop striker is aligned to a downstop mounted on a top side of the outboard rib.

12. The tiltrotor aircraft of claim 9, wherein the outboard connection portion allows movement of the conversion actuator attachment element when the proprotor gearbox is moved between an airplane mode position and a helicopter mode position.

13. The tiltrotor aircraft of claim 9, wherein the fitting further comprises:
    a cavity between a forward side and an aft side of the fitting, and a downstop striker is mounted within the cavity.

* * * * *